US012663352B2

(12) United States Patent
Zheng et al.

(10) Patent No.: US 12,663,352 B2
(45) Date of Patent: Jun. 23, 2026

(54) ESR DETECTION DEVICE AND ESR DETECTION METHOD

(71) Applicant: SHENZHEN MINDRAY BIO-MEDICAL ELECTRONICS CO., LTD., Shenzhen (CN)

(72) Inventors: Wenbo Zheng, Shenzhen (CN); Jinxiu Si, Shenzhen (CN); Bo Ye, Shenzhen (CN); Wenpeng Xun, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 227 days.

(21) Appl. No.: 18/510,605

(22) Filed: Nov. 15, 2023

(65) Prior Publication Data

US 2024/0159640 A1 May 16, 2024

(30) Foreign Application Priority Data

Nov. 16, 2022 (CN) .......................... 202211438380.8

(51) Int. Cl.
    *G01N 15/05*     (2006.01)
    *G01N 15/01*     (2024.01)

(52) U.S. Cl.
    CPC ....... *G01N 15/05* (2013.01); *G01N 2015/012* (2024.01); *G01N 2015/016* (2024.01); *G01N 2015/055* (2013.01)

(58) Field of Classification Search
    CPC ............... G01N 15/05; G01N 15/1031; G01N 2015/012; G01N 2015/016;
    (Continued)

(56) References Cited

U.S. PATENT DOCUMENTS 8,425,843 B2   4/2013   Ciotti
2008/0098828 A1*   5/2008   Li ...................... G01N 35/1097
                         73/863.73
(Continued)

FOREIGN PATENT DOCUMENTS

CN     104641230 A     5/2015
CN     109564209 A     4/2019
(Continued)

OTHER PUBLICATIONS

Lui et al "Sample Analyzer and Sample Analysis Method", May 27, 2021, WO 2021 098398 A1. (Year: 2021).*
(Continued)

*Primary Examiner* — Sang H Nguyen
(74) *Attorney, Agent, or Firm* — Syncoda LLC; Feng Ma

(57) ABSTRACT

An ESR detection device and an ESR detection method are provided, the ESR detection device including a sample collecting and dispensing module, an ESR detection module and a data processing module. The sample collecting and dispensing module is configured for dispensing at least part of a blood sample to the ESR detection module. The ESR detection module is configured for obtaining disaggregation optical data during disaggregation of erythrocytes and/or aggregation optical data during reaggregation of erythrocytes. The data processing module is configured for obtaining an ESR detection result of the blood sample based on the aggregation optical data, determining, based on the disaggregation optical data and/or the aggregation optical data, whether or not there is a sample abnormality that leads to an abnormality in the ESR detection result, and outputting an alarm prompt when it is determined that the sample abnormality is present, thereby reducing clinical risk.

18 Claims, 6 Drawing Sheets

(58) Field of Classification Search
CPC ..... G01N 2015/055; G01N 2015/1006; G01N
2015/1024; G01N 2015/103; G01N
2015/1486; G01N 2015/0092; G01N
2015/018; G01N 2015/1497; G01N
35/00594
See application file for complete search history.

(56) References Cited

U.S. PATENT DOCUMENTS

| | | | | |
|---|---|---|---|---|
| 2015/0268221 A1* | 9/2015 | Fukuda | ................. | G01N 35/10 |
| | | | | 73/61.43 |
| 2017/0276662 A1* | 9/2017 | Machida | .............. | G01N 33/491 |
| 2019/0304093 A1* | 10/2019 | Duval | .................... | G16H 30/40 |
| 2019/0324036 A1* | 10/2019 | Xin | ........................ | G16B 40/00 |
| 2021/0116349 A1* | 4/2021 | Galiano | ................. | G01N 15/05 |

FOREIGN PATENT DOCUMENTS

| | | | |
|---|---|---|---|
| CN | 110537088 | A | 12/2019 |
| CN | 111712703 | A | 9/2020 |
| CN | 112119293 | A | 12/2020 |
| CN | 114113643 | A | 3/2022 |
| CN | 115901552 | A | 4/2023 |
| CN | 116165107 | A | 5/2023 |
| CN | 116165108 | A | 5/2023 |
| CN | 116183452 | A | 5/2023 |
| EP | 4063825 | A1 | 9/2022 |

OTHER PUBLICATIONS

Extended European Search Report issued in related European Application No. 23210300.2, mailed Apr. 11, 2024, 7 pages.

* cited by examiner

100

ESR DETECTION DEVICE AND ESR DETECTION METHOD

CROSS-REFERENCE

This application claims the benefit of priority to the Chinese Patent Application No. 202211438380.8, entitled "ESR DETECTION DEVICE AND ESR DETECTION METHOD" and filed on Nov. 16, 2022, the contents of which are incorporated herein by reference.

TECHNICAL FIELD

The present disclosure relates to the field of in-vitro diagnostics, and in particular to an ESR detection device and an ESR detection method.

BACKGROUND

Erythrocyte sedimentation rate (ESR) refers to a rate at which erythrocytes in an in vitro anticoagulation blood naturally sediment under specified conditions. ESR is used for differential diagnosis of some diseases and disease observation, and is a commonly used index reflecting the level of erythrocyte aggregation, which has a differential significance for the quiescent stage of diseases, stable disease and disease relapse, and benign tumor and malignant tumor.

A current commonly used method for measuring ESR is a Westergren method, which is performed by observing and recording the erythrocyte sedimentation rate of a blood contained in a Westergren ESR tube. Usually, in the Westergren method, a blood sample is firstly injected into the tube, and then the distance (height of the suspension medium) of the interface between clustered cells and plasma from the liquid level in the top of the tube is observed after one hour, so as to measure ESR.

However, measuring ESR by using the Westergren method (also called a reference method) has following disadvantages: 1) the measurement speed is low, the sedimentation time is required to be one hour, and with the increase of a large number of patients in hospitals, the detection efficiency with measurement results within one hour may not meet the daily detection requirements; 2) the blood consumption is large, and about 1 mL of blood is usually required to fill the sedimentation tube with the blood, which is not possible for patients who have their finger peripheral blood collected.

Therefore, in order to overcome the above-mentioned disadvantages of the Westergren method, a rapid ESR measurement method (hereinafter also referred to as an erythrocyte aggregation method) has been developed based on the study of hemorheology, that is, a method for predicting the erythrocyte sedimentation rate by measuring the erythrocyte aggregation index. ESR measurement values are calculated from measuring change in the scattering rate/transmission of light by blood cells during the formation of rouleaux erythrocytes. This measurement process can be completed in a short time (about 20 s) and consumes only about 100 uL of blood. Such a method indicates that there is a certain correlation between the erythrocyte aggregation index and the erythrocyte sedimentation rate.

However, although ESR values may be obtained quickly by the erythrocyte aggregation method, for some special samples, there is still a large difference between ESR values measured by the erythrocyte aggregation method and ESR values measured by the Westergren method, resulting in a higher clinical risk.

SUMMARY

Therefore, the object of the present disclosure is to provide an ESR detection device and an ESR detection method, which are capable of alerting against special samples with larger difference between ESR obtained by the aggregation method and ESR obtained by the Westergren method (i.e., ESR obtained by the aggregation method is unreliable), so as to minimize the clinical risk.

In order to achieve the above object of the present disclosure, a first aspect of the present disclosure firstly provides an ESR detection device, comprising a sample collecting and dispensing module, an ESR detection module and a data processing module;

the sample collecting and dispensing module is configured for collecting a blood sample to be tested and dispensing at least part of the blood sample to be tested to the ESR detection module;

the ESR detection module is configured for disaggregating erythrocytes in the at least part of the blood sample by causing the dispensed at least part of the blood sample to flow back and forth in a detection zone of the ESR detection module, and stopping the disaggregation process such that the erythrocytes in the at least part of the blood sample in the detection zone are reaggregated, so as to obtain disaggregation optical data of the at least part of the blood sample during disaggregation of the erythrocytes and/or aggregation optical data of the at least part of the blood sample during aggregation of the erythrocytes;

the data processing module is configured for:
obtaining an ESR detection result of the blood sample to be tested based on the aggregation optical data,
determining, based on at least one of the disaggregation optical data and the aggregation optical data, whether or not there is a sample abnormality in the blood sample to be tested that leads to an abnormality in the ESR detection result, and
outputting an alarm prompt when it is determined that the sample abnormality is present.

In the ESR detection device provided in the first aspect of the present disclosure, it is capable of obtaining disaggregation optical data of the blood sample to be tested during disaggregation of the erythrocytes and/or aggregation optical data of the blood sample to be tested during reaggregation of the erythrocytes, and determining, based on the disaggregation optical data and/or the aggregation optical data, whether or not there is a sample abnormality in the blood sample to be tested that leads to an abnormality in the ESR detection result, and then outputting an alarm prompt when it is determined that the sample abnormality is present, so as to prompt that the detection result of the blood sample to be tested obtained by the erythrocyte aggregation method is unreliable, thereby reducing clinical risk.

A second aspect of the present disclosure provides a corresponding ESR detection method, comprising:
collecting a blood sample to be tested and transporting at least part of the blood sample to be tested to an ESR detection pipe;
disaggregating erythrocytes in the at least part of the blood sample by causing the at least part of the blood sample to flow back and forth in the ESR detection pipe, and stopping the disaggregation process such that the erythrocytes in the at least part of the blood sample in the ESR detection pipe are reaggregated, so as to obtain, by means of optical measurement, disaggregation optical data of the at least part of the blood sample during disaggregation of the erythrocytes and/or aggregation optical data of the at least part of the blood sample during reaggregation of the erythrocytes;

obtaining an ESR detection result of the blood sample to be tested based on the aggregation optical data;

determining, based on at least one of the disaggregation optical data and the aggregation optical data, whether or not there is a sample abnormality in the blood sample to be tested that leads to an abnormality in the ESR detection result;

outputting an alarm prompt when it is determined that the sample abnormality is present.

The ESR detection method according to the second aspect of the present disclosure may in particular be applied to the ESR detection device according to the first aspect of the present disclosure.

DETAILED DESCRIPTION

The embodiments of the present disclosure will be described below clearly and completely in conjunction with the accompanying drawings. Obviously, the embodiments described are merely some rather than all of the embodiments of the present disclosure. All other embodiments obtained by a person skilled in the art based on the embodiments of the present disclosure without creative efforts shall fall within the protection scope of the present disclosure.

The inventors of the present disclosure have found that erythrocytes in an in vitro blood sample are in a naturally aggregated state. Before using the erythrocyte aggregation method to perform a ESR test, erythrocytes in a blood sample need to be made to flow at a high speed in an ESR detection pipe so as to make the erythrocytes in the blood sample fully disaggregated, and then to make the erythrocytes in the blood sample to reaggregate naturally, wherein the process of reaggregating after the erythrocyte disaggregation is the basis of performing the ESR test by using the erythrocyte aggregation method.

However, for some special samples with a sample abnormality, such as samples with erythrocyte in vivo aggregation, erythrocyte clusters thereof may sink directly in the Westergren method, thereby showing ESR high-value characteristics. However, since erythrocytes of such special samples are already in an aggregated state in vivo, the erythrocytes in the samples may not be effectively disaggregated in the high-speed flow process of the erythrocyte aggregation method, which results in that such samples having basically no aggregation characteristics during the erythrocyte reaggregation, and corresponding ESR values tend to be zero value. That is, such specific samples have a large difference between ESR values measured by the erythrocyte aggregation method and ESR values measured by the Westergren method. Moreover, even if a retest is performed, the problem of ESR abnormality due to abnormality of the sample itself may not be solved, resulting in higher clinical risk.

Therefore, the present disclosure provides a technical solution capable of outputting an abnormal prompt when it is determined that there is a sample abnormality in a blood sample to be tested that leads to an abnormality in the ESR detection result.

Figure 1:
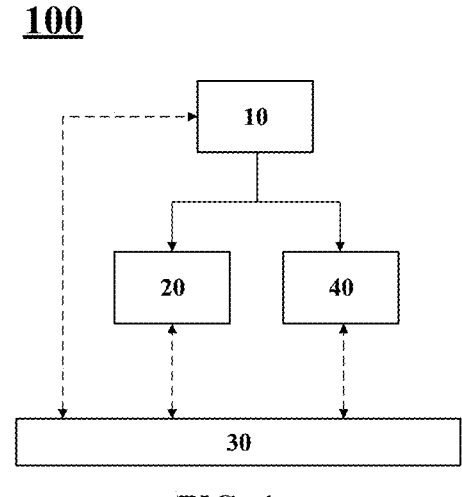
FIG. 1 is a block diagram of an embodiment of an ESR detection device according to the present disclosure.

With reference to FIG. 1, the present disclosure first provides an ESR detection device 100. The ESR detection device 100 includes a sample collecting and dispensing module 10, an ESR detection module 20 and a data processing module 30.

The sample collecting and dispensing module 10 is configured for collecting a blood sample to be tested and dispensing at least part of the blood sample to be tested to the ESR detection module 20.

The ESR detection module 20 is configured for disaggregating erythrocytes in the at least part of the blood sample by causing the dispensed at least part of the blood sample to flow back and forth in a detection zone of the ESR detection module, and stopping the disaggregation process such that the erythrocytes in the at least part of the blood sample in the detection zone are reaggregated, so as to obtain disaggregation optical data of the at least part of the blood sample during disaggregation of the erythrocytes and/or aggregation optical data of the at least part of the blood sample during reaggregation of the erythrocytes.

The data processing module 30 is configured for obtaining an ESR detection result of the blood sample to be tested based on the aggregation optical data, i.e. obtaining an ESR detection result of the blood sample to be tested based on the erythrocyte aggregation method.

In some embodiments, as shown in FIG. 1, the ESR detection device 100 may further include a blood routine detection module 40. In these embodiments, the sample collecting and dispensing module 10 is further configured for dispensing another part of the blood sample to be tested to the blood routine detection module 40; the blood routine detection module 40 is configured for performing blood routine detection on the another part of the blood sample to obtain blood routine detection data of the blood sample to be tested; and the data processing module 30 is further configured for correcting the ESR detection result according to the blood routine detection data to obtain a corrected ESR detection result.

In some embodiments, as indicated by the broken lines with double sided arrows in FIG. 1, the data processing module 30 may be communicatively connected to the sample collecting and dispensing module 10, the ESR detection module 20, and the blood routine detection module 40, respectively, to enable the sample collecting and dispensing module 10, the ESR detection module 20 and the blood routine detection module 40 to interact with each other in order to accomplish the ESR detection and the blood routine detection of the blood sample to be tested.

Figure 2:
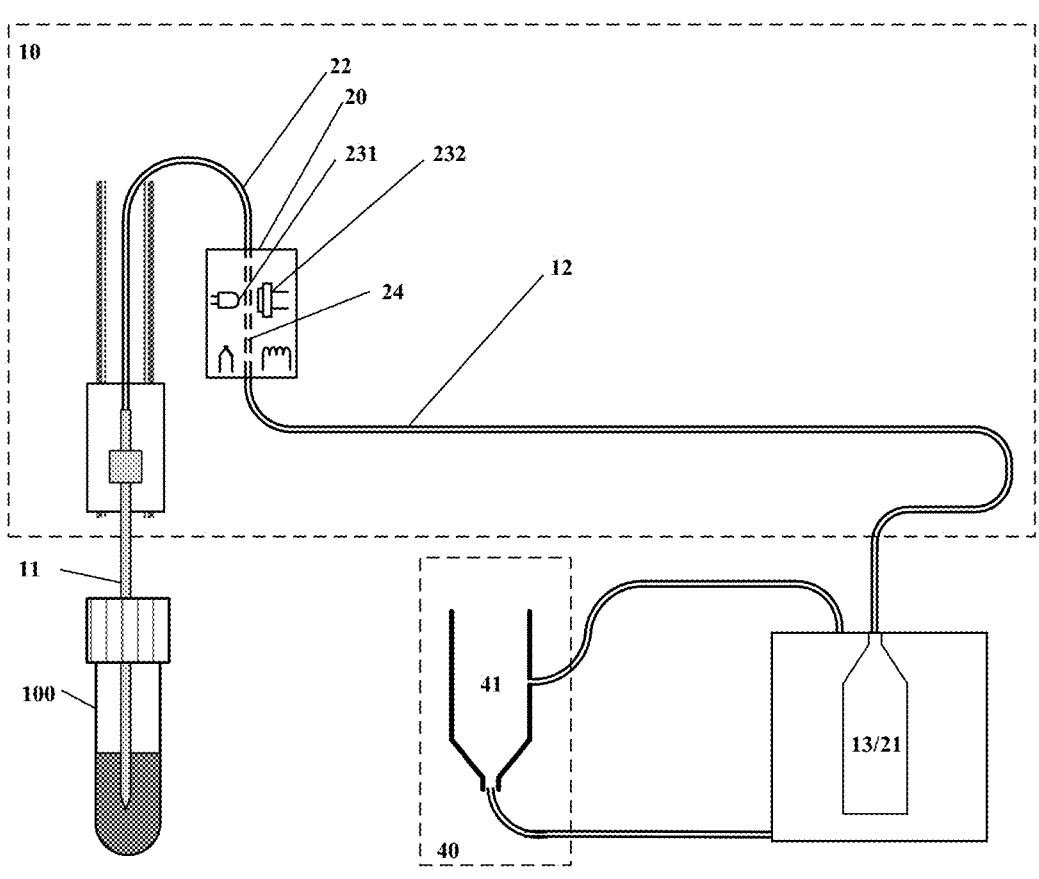
FIG. 2 is a schematic diagram showing the structure of an embodiment of an ESR detection device according to the present disclosure.

In one specific example of the ESR detection device 100, as shown in FIG. 2, the sample collecting and dispensing module 10 may include a sampling needle 11, a power delivery pipe 12, and a sample collecting and dispensing power assembly 13, the power delivery pipe 12 being configured for fluidly connecting the sampling needle 11 with the sample collecting and dispensing power assembly 13. The sample collecting and dispensing power assembly 13 is configured for driving the sampling needle 11 to aspirate the blood sample to be tested through the power delivery pipe 12 and driving the sampling needle 11 to dispense the aspirated blood sample to be tested. The blood sample to be tested is usually stored in a test tube 100, and the sampling needle 11 is configured for aspirating the blood sample to be tested from the test tube 100.

In some embodiments, the sample collecting and dispensing module 10 may dispense different parts of the blood sample to be tested to the ESR detection module 20 and the blood routine detection module 40 respectively in a one-time collection and multi-time dispensation manner or in a multi-time collection and dispensation manner.

With reference to FIG. 2, the ESR detection module 20 may include an ESR power assembly 21, an ESR detection pipe 22 and an optical detection assembly having a light emitter 231 and a light receiver 232.

The ESR detection pipe 22 is used to provide a detection place for the dispensed part of the blood sample. The ESR power assembly 21 is configured for transporting, e.g. sucking, the blood sample to be tested into the ESR detection pipe 22. The light emitter 231 and the light receiver 232 are respectively located at two sides of a detection zone 24 of the ESR detection pipe 22. The light emitter 231 is configured for irradiating the dispensed part of the blood sample within the detection zone 24. The light receiver 232 is configured for detecting the amount of change in the light emitted by light emitter 231 after irradiating the dispensed part of the blood sample (e.g., receiving light transmitted through and/or scattered by the part of the blood sample), and the degree of absorption or scattering of light by the dispensed part of the blood sample within the detection zone 24 is detected by detecting the received amount of light. Since the scattering or transmission of light irradiated on the blood sample changes during the erythrocyte aggregation (forming rouleaux) in the blood sample, the degree of scattering or absorption of light by the blood sample may be detected by detecting the received amount of transmitted or scattered light after irradiating the blood sample, thereby measuring the erythrocyte sedimentation rate. The optical detection assembly tests the blood sample in particular by means of transmission turbidimetry.

When the ESR detection module 20 is started for detecting, the sample collecting and dispensing power assembly 13 may be preferably used as the ESR power assembly 21 and further used for sucking the blood sample to be tested in the test tube 100 into the ESR detection pipe 22 through the sampling needle 11, making the blood sample to be tested flow to the detection zone 24 and then stopping the movement of the blood sample to be tested and then keeping the blood sample to be tested still. The light emitter 231 irradiates the blood sample in the detection zone 24, and the light receiver 232 detects the degree of scattering or transmission of light emitted by the light emitter 231 after irradiating the blood sample in the detection zone 24, so as to detect an erythrocyte aggregation level, for example, an erythrocyte aggregation speed, of the blood sample to be tested.

In some embodiments, the ESR power assembly 21 may be configured for: after the dispensed part of the blood sample is conveyed into the ESR detection pipe 22 and before it is tested by the optical detection assembly, causing the dispensed part of the blood sample to flow back and forth in the ESR detection pipe 22 to disaggregate erythrocytes in the dispensed part of the blood sample. This makes it possible to dispense the erythrocytes in the dispensed part of the blood sample in the ESR detection pipe 22 as much as possible before erythrocyte aggregation level is detected by the optical detection assembly having the light emitter 231 and the light receiver 232, so that the disaggregation optical data of the dispensed part of the blood sample during the erythrocyte disaggregation may be acquired, and the erythrocyte aggregation level may be measured more accurately.

In particular, by configuring the ESR power assembly 21 as a syringe, since the movement speed and the movement direction of the syringe may be flexibly configured, the blood sample may be disaggregated flexibly, and the amount of blood may be saved.

In some embodiments, the ESR power assembly 21 may also be configured for stopping driving (i.e., stopping the disaggregation process) immediately after causing the dispensed part of the blood sample to flow back and forth (e.g., back and forth for a predetermined number of times) in the ESR detection pipe 22, so that the erythrocytes in the dispensed part of the blood sample in the detection zone 24 of the ESR detection pipe 22 are aggregated, so that the optical detection assembly detects transmitted light transmitted through the part of the blood sample or scattered light scattered by the part of the blood sample, so as to acquire aggregation optical data of the dispensed part of the blood sample during the erythrocyte aggregation.

In some embodiments, the ESR detection pipe 22 may be made of a hose, and the detection zone 24 of the ESR detection pipe 22 is made of a light-transparent material. Therefore, the ESR detection pipe 22 may be configured in any flexible manner, such as vertically, horizontally, or obliquely, or in a curved manner, which is not limited.

With continued reference to FIG. 2, the blood routine detection module 40 may include a reaction cell 41 and a detection assembly (not shown in FIG. 2), wherein the reaction cell 41 is used for providing a place for the dispensed blood sample to mix with reagents, and the detection assembly performs blood routine detection on a sample fluid to be tested obtained by mixing the blood sample with the reagents in the reaction cell 41.

A person skilled in the art will appreciate that the detection assembly of the blood routine detection module 40 may include at least one of an optical detection unit, an impedance detection unit, and a hemoglobin detection unit. Correspondingly, the reaction cell 41 may include at least one of an optical detection reaction cell, an impedance detection reaction cell, and a hemoglobin detection reaction cell. When the blood routine detection module 40 performs a blood routine detection on a blood sample, the blood sample and corresponding reagents (such as a diluent and/or a hemolytic agent and/or a staining agent, etc.) may be added to the reaction cell 41, and the blood sample in the reaction cell 41 may be measured by the detection assembly to obtain at least one blood cell parameter, which may include at least one of WBC (White blood cell) classification parameters, WBC count and morphology parameters, HGB (Hemoglobin) parameters, RBC (Red blood cell), and PLT (blood platelet) count and morphology parameters or a combination thereof.

In some embodiments, the blood routine detection module 40 may include an impedance detection unit including a detection aperture and a detection circuit, wherein the detection circuit is arranged to detect, based on an impedance method, pulse signals of cells in the part of the blood sample dispensed to the impedance detection unit when passing through the detection aperture. Here, the impedance detection unit is configured to realize blood routine detection based on the Coulter method (also referred to as the impedance method).

In some embodiments, the blood routine detection module 40 may include an optical detection unit having a light source, a flow chamber and a light detector, wherein the light source is arranged to emit a light beam to irradiate a detection zone of the flow chamber, and the light detector is arranged to detect, based on an optical method, pulse signals generated by cells in the blood sample portion dispensed to the optical detection unit after being irradiated with light while when passing through the detection zone. Here, the optical detection unit is configured to enable blood routine detection based on flow cytometry.

In some embodiments, at least one of a forward scattered light detector for detecting forward scattered light (FSC), a side scattered light detector for detecting side scattered light (SSC), and a fluorescence detector for detecting fluorescence (SFL) may be provided. The forward scattered light characterizes the cell volume, the side scattered light characterizes the cell interior complexity, and the fluorescence characterizes the nucleic acid content within the cell.

In some embodiments, the data processing device 30 may include a processor, wherein the processor includes, but is not limited to, Central Processing Unit (CPU), Micro Controller Unit (MCU), Field-Programmable Gate Array (FPGA), Digital Signal Processor (DSP), and the like for interpreting computer instructions as well as for processing data in computer software. For example, the processor is configured for executing computer applications in the computer readable storage medium, so as to cause the ESR detection device 100 to perform a corresponding detection procedure to obtain ESR detection process data of the dispensed at least part of the blood sample, such as disaggregation optical data during the erythrocyte disaggregation and/or aggregation optical data during the erythrocyte aggregation, and obtain an ESR detection result (i.e. ESR of the aggregation method) of the blood sample to be tested based on the obtained aggregation optical data; and alternatively or additionally correct the obtained ESR detection result based on the blood routine detection data, so as to obtain a corrected ESR detection result (i.e. corrected ESR of the aggregation method).

Table 1 schematically shows the ESR values of the aggregation method, the corrected ESR values of the aggregation method, and the ESR values of the Westergren method of 3 abnormal samples with erythrocyte in vivo aggregation.

TABLE 1

| sample number | ESR value of the aggregation method | corrected ESR value of the aggregation method | ESR value of the Westergren method |
|---|---|---|---|
| 1 | 0 | 0 | 141 |
| 2 | 0 | 0 | 153 |
| 3 | 0 | 0 | 156 |

As shown in table 1, for these special samples, the ESR values of the aggregation method and the corrected ESR values of the aggregation method were significantly lower than the ESR values of the Westergren method, i.e., the ESR values of the aggregation method and the corrected ESR values of the aggregation method were unreliable. For such samples, there is a higher clinical risk if there is no alarm prompt.

Therefore, the present disclosure proposes to determine, based on the detection process data of the erythrocyte aggregation method, whether or not there is a sample abnormality in the blood sample to be tested that leads to an abnormality in the ESR detection result.

Therefore, in some embodiments of the present disclosure, the data processing module 30 may be configured for determining, based on at least one of the disaggregation optical data and the aggregation optical data, whether or not there is a sample abnormality in the blood sample to be tested that leads to an abnormality in the ESR detection result, and outputting an alarm prompt when it is determined that the sample abnormality is present, so as to prompt that the EST value of the aggregation method for the blood sample to be tested is unreliable (such as, the sample to be tested may be a sample with erythrocyte in vivo aggregation), thereby reducing clinical risk.

The specific manners of how the data processing module of the ESR detection device determines, based on at least one of the disaggregation optical data and the aggregation optical data, whether or not there is a sample abnormality in the blood sample to be tested which leads to an abnormality in the ESR detection result, are further described below in combination with some embodiments.

The inventors of the present disclosure have noted that one of the key influence factors of the ESR detection based on the erythrocyte aggregation method is the erythrocyte disaggregation level before detection.

For some abnormal blood samples to be tested, such as samples with erythrocyte in vivo aggregation, when the erythrocyte aggregation method is used for the ESR detection, since the erythrocytes are already in an aggregated state in vivo before the erythrocytes are reaggregated, transmissivity levels of such samples during the erythrocyte disaggregation are integrally higher than that of normal samples during the erythrocyte disaggregation.

Figure 3:
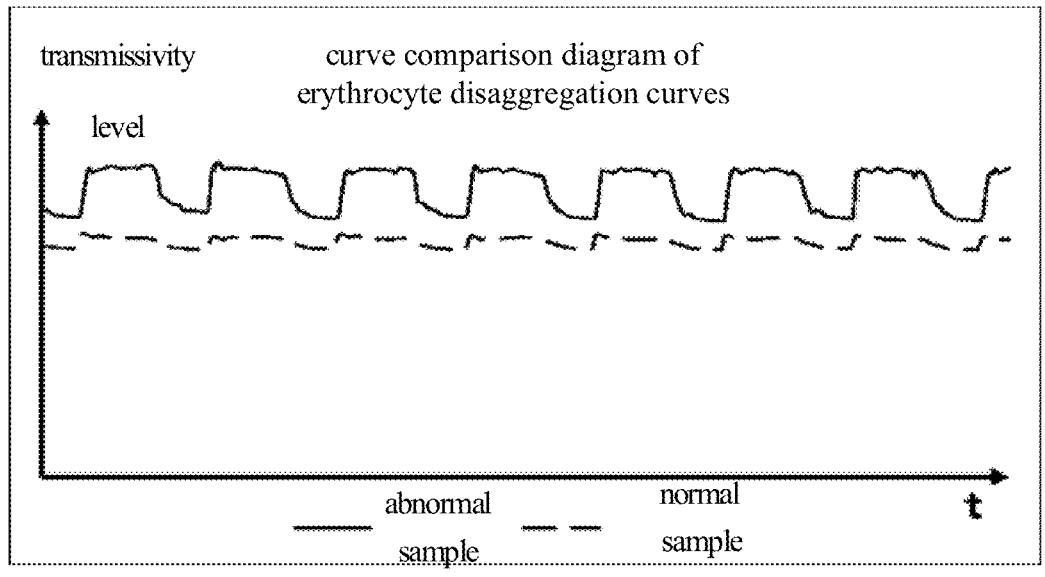
FIG. 3 is a curve comparison diagram of erythrocyte disaggregation curves during disaggregation of an abnormal sample with a sample abnormality and a normal sample without a sample abnormality according to an embodiment of the present disclosure.

FIG. 3 shows a curve comparison diagram of erythrocyte disaggregation curves (here are curves of light intensity transmitted through the blood sample during the disaggregation process over time) of an abnormal sample with erythrocyte in vivo aggregation and a normal sample during disaggregation, wherein the abnormal sample and the normal sample have practically similar aggregation results. As shown in FIG. 3, the erythrocyte disaggregation curve of the abnormal sample has a higher transmissivity and a larger fluctuation compared to the normal sample with a practically similar aggregation result.

Therefore, whether or not there is a sample abnormality in the blood sample to be tested that leads to an abnormality in the ESR detection result may be determined based on the disaggregation optical data of the blood sample to be tested during disaggregation of the erythrocytes. That is to say, in some embodiments, the data processing module 30 may be configured for determining, based on the disaggregation optical data, whether or not there is a sample abnormality in the blood sample to be tested that leads to an abnormality in the ESR detection result.

Figure 4:
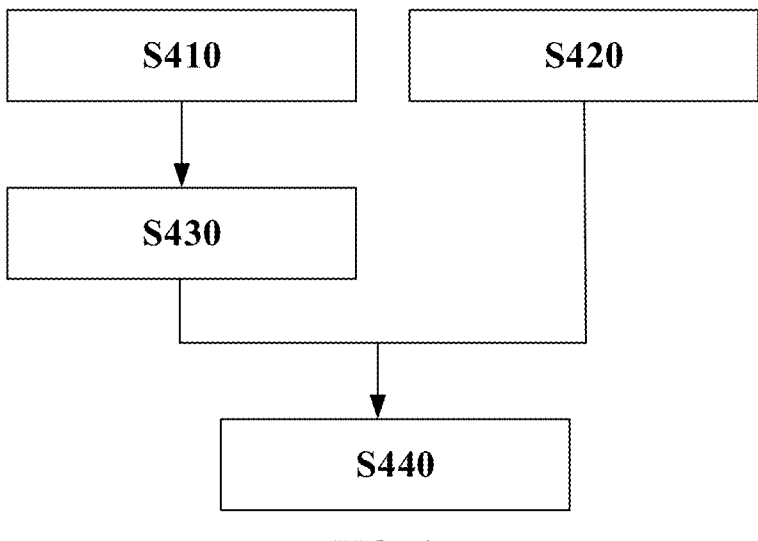
FIG. 4 is a flowchart of an embodiment of determining a sample abnormality by a data processing module of the ESR detection device according to the present disclosure.

In some implementations, as illustrated in FIG. 4, the data processing module 30 may be further configured for performing the following steps:

S410: obtaining a first aggregation characteristic value based on the aggregation optical data;

S420: obtaining a disaggregation characteristic value based on the disaggregation optical data;

S430: determining a first determining threshold range based on the first aggregation characteristic value; and S440: determining that there is a sample abnormality in the blood sample to be tested that leads to an abnormality in the ESR detection result, when the disaggregation characteristic value exceeds the first determining threshold range.

In the embodiment shown in FIG. 4, after the first aggregation characteristic value is obtained, it is determined within which theoretical range the disaggregation characteristic value of the blood sample having the first aggregation characteristic value should be (i.e. the first determining threshold range is determined based the first aggregation characteristic value). When the disaggregation characteristic value of the blood sample to be tested exceeds the theoretical range, it is indicated that there is a sample abnormality in the blood sample to be tested that leads to an abnormality in ESR detection result.

In some embodiments, the aggregation optical data may include an erythrocyte aggregation curve of light intensity of transmission light transmitted through the dispensed at least part of the blood sample or scattered light scattered by the at least part of the blood sample over time during reaggregation of the erythrocytes.

Figure 5:
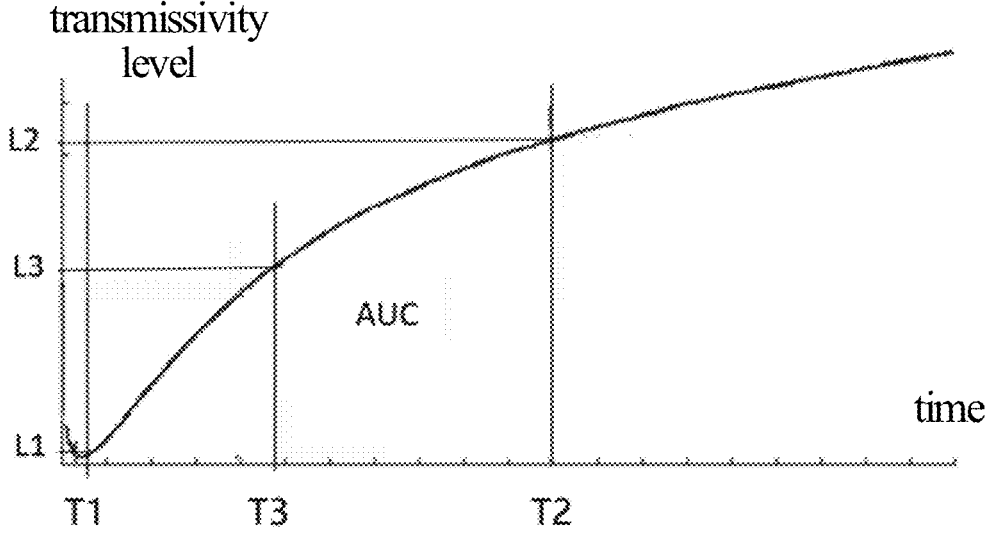
FIG. 5 is an erythrocyte aggregation curve measured by an ESR detection module of an ESR detection device according to the present disclosure based on the erythrocyte aggregation method.

FIG. 5 shows an erythrocyte aggregation curve C measured by the ESR detection module 20 provided according to an embodiment of the present disclosure, wherein transmissivity (also referred to as transmission) is relative light intensity, which is equal to the ratio of transmission light intensity to background light intensity. The first aggregation characteristic value may be obtained from the erythrocyte aggregation curve C.

In some embodiments, the first aggregation characteristic value may be the ESR detection result. In some other embodiments, the first aggregation characteristic value may be the corrected ESR detection result obtained by correcting the ESR detection result based on blood routine detection data. In some yet other embodiments, the first aggregation characteristic value may also be an area AUC (Area Under Curve) enclosed by the erythrocyte aggregation curve and a time axis in a time period from a measurement starting time point T1 to a measurement ending time point T2.

In some embodiments, the disaggregation optical data may include an erythrocyte disaggregation curve of light intensity of transmission light transmitted through the at least part of the blood sample or scattered light scattered by the at least part of the blood sample over time during disaggregation of the erythrocytes.

In some embodiments, the disaggregation characteristic value may be a mean value of the light intensity of the erythrocyte disaggregation curve in the time period from the measurement starting time point to the measurement ending time point, or a standard deviation of the light intensity of the erythrocyte disaggregation curve in the time period from the measurement starting time point to the measurement ending time point. For instance, the erythrocyte disaggregation curve is a curve of the transmission light transmitted through the at least part of the blood sample over time during disaggregation of the erythrocytes, and the disaggregation characteristic value may be a mean value or a standard deviation of the light intensity of the erythrocyte disaggregation curve in the time period from the measurement starting time point to the measurement ending time point.

For example, in the embodiment as shown in FIG. 4, the theoretical range (i.e. the first determining threshold range) of the obtained disaggregation characteristic value may be determined according to the ESR detection result, the corrected ESR detection result, or the AUC of the erythrocyte aggregation curve (i.e. the first aggregation characteristic value) of the blood sample to be tested, and then the theoretical range may be used as a determination criterion of the disaggregation characteristic value to determine whether there is a sample abnormality in the blood sample to be tested that causes an abnormality in the ESR detection result. For example, if the obtained disaggregation characteristic value exceeds the theoretical range, it is indicated that the blood sample to be tested has data abnormality during disaggregation of the erythrocytes, and it may be further determined that the sample abnormality causing an abnormality in the ESR detection result exists in the blood sample to be tested; if the obtained disaggregation characteristic value does not exceed the theoretical range, it is indicated that the sample abnormality causing an abnormality in the ESR detection result does not exist in the blood sample to be tested.

In addition, for some abnormal blood samples, such as samples with erythrocyte in vivo aggregation, when the erythrocyte aggregation method is used for the ESR detection, since the erythrocytes are already in an aggregated state in vivo before the erythrocytes are reaggregated, transmissivity levels of such samples during the erythrocyte aggregation are integrally higher than those of normal samples during the erythrocyte aggregation.

Figure 6:
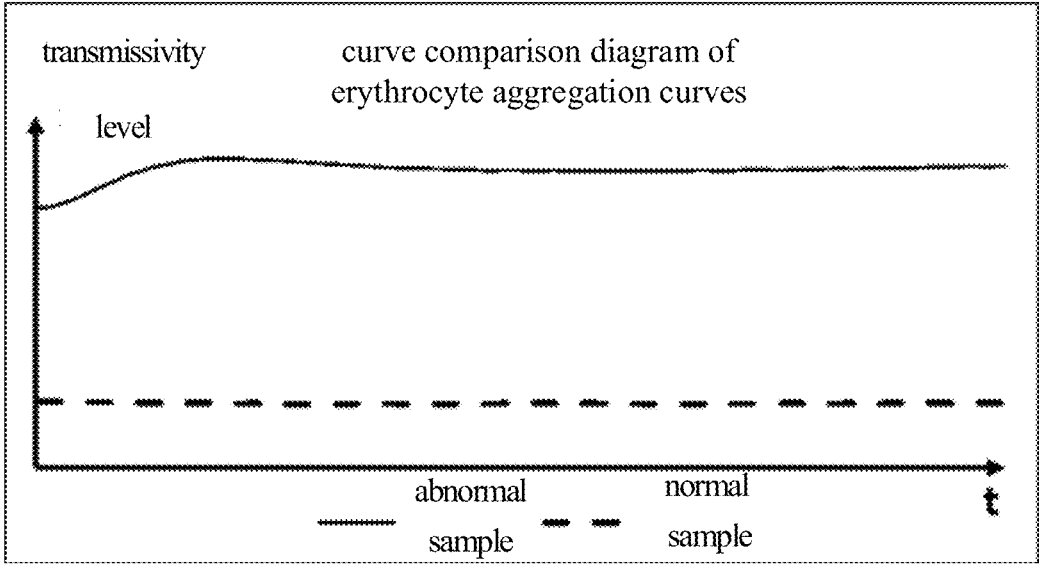
FIG. 6 is a curve comparison diagram of erythrocyte disaggregation curves during disaggregation of an abnormal sample with a sample abnormality and a normal sample without a sample abnormality according to an embodiment of the present disclosure.

FIG. 6 shows a curve comparison diagram of erythrocyte aggregation curves (here are curves of light intensity transmitted through the blood sample during the aggregation process over time) of an abnormal sample with erythrocyte in vivo aggregation and a normal sample during reaggregation, wherein the abnormal sample and the normal sample have practically similar aggregation results. As shown in FIG. 6, the erythrocyte aggregation curve of the abnormal sample has a higher transmissivity and a higher starting point compared to the normal sample with a practically similar aggregation result.

Therefore, whether or not there is a sample abnormality in the blood sample to be tested that leads to an abnormality in the ESR detection result may be determined based on the aggregation optical data of the blood sample to be tested during reaggregation of the erythrocytes. That is to say, in some other embodiments, the data processing module 30 may be configured for determining, based on the aggregation optical data, whether or not there is a sample abnormality in the blood sample to be tested that leads to an abnormality in the ESR detection result.

Figure 7:
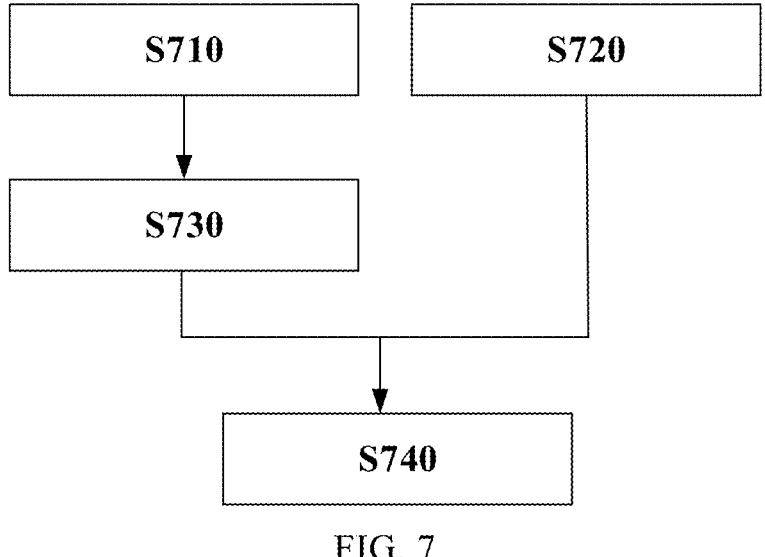
FIG. 7 is a flowchart of another embodiment of determining a sample abnormality by the data processing module of the ESR detection device according to the present disclosure.

In some implementations, as illustrated in FIG. 7, the data processing module 30 may be further configured for performing the following steps:

> S710: obtaining a first aggregation characteristic value based on the aggregation optical data;
>
> S720: obtaining a second aggregation characteristic value different from the first aggregation characteristic value based on the aggregation optical data;
>
> S730: determining a second determining threshold range based on the first aggregation characteristic value;
>
> S740: determining that there is a sample abnormality in the blood sample to be tested that leads to an abnormality in the ESR detection result, when the second aggregation characteristic value exceeds the second determining threshold range.

In the embodiment shown in FIG. 7, after the first and second aggregation characteristic values are obtained, it is determined within which theoretical range the second aggregation characteristic value of the blood sample having the first aggregation characteristic value should be (i.e., determining the second determining threshold range based the first aggregation characteristic value). When the second aggregation characteristic value of the blood sample to be tested exceeds the theoretical range, it is indicated that there is a sample abnormality in the blood sample to be tested that leads to an abnormality in the ESR detection result.

In some embodiments, with continued reference to FIG. 5, the second aggregation characteristic value may be one of the following parameters: a minimum value L1 of the light intensity of the erythrocyte aggregation curve C in the time period from the measurement starting time point T1 to the measurement ending time point T2; a difference value D=L2−L1 between the light intensity L1 at the measurement starting time point T1 and the light intensity at the measurement ending time point T2; and a time point T3 corresponding to ½ of the light intensity L2 at the measurement ending time point T2.

Preferably, the second aggregation characteristic value may be the time point T3 corresponding to ½ (L3=L2/2) of the light intensity L2 at the measurement ending time point T2.

For example, in the embodiment as shown in FIG. 7, the theoretical range (i.e. the second determining threshold range) of the obtained second aggregation characteristic value may be determined according to the ESR detection result, the corrected ESR detection result, or the AUC of the erythrocyte aggregation curve (i.e. the first aggregation characteristic value) of the blood sample to be tested, and then the theoretical range may be used as a determination criterion of the second aggregation characteristic value to determine whether there is a sample abnormality in the blood sample to be tested that causes an abnormality in the ESR detection result. For example, if the obtained second aggregation characteristic value exceeds the theoretical range, it is indicated that the blood sample to be tested has data abnormality during the erythrocyte aggregation, and it may be further determined that the sample abnormality causing an abnormality in the ESR detection result exists in the blood sample to be tested; if the obtained second aggregation characteristic value does not exceed the theoretical range, it is indicated that the sample abnormality causing an abnormality in the ESR detection result does not exist in the blood sample to be tested.

In some preferred embodiments, whether or not there is a sample abnormality in the blood sample to be tested that leads to an abnormality in the ESR detection result may be determined based on the disaggregation optical data of the blood sample to be tested during disaggregation of the erythrocytes and the aggregation optical data of the blood sample to be tested during reaggregation of the erythrocytes. That is to say, the data processing module 30 may be further configured for determining, based on the disaggregation optical data and the aggregation optical data, whether or not there is a sample abnormality in the blood sample to be tested that leads to an abnormality in the ESR detection result.

Figure 8:
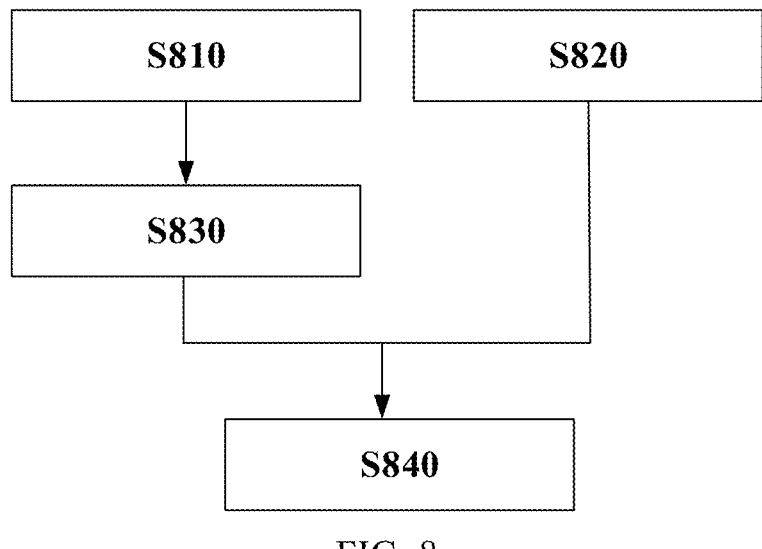
FIG. 8 is a flowchart of yet another embodiment of determining a sample abnormality by the data processing module of the ESR detection device according to the present disclosure.

In some implementations, as illustrated in FIG. 8, the data processing module 30 may be further configured for performing the following steps:

> S810: obtaining, based on the aggregation optical data, a first aggregation characteristic value and a second aggregation characteristic value different from the first aggregation characteristic value;
>
> S820: obtaining a disaggregation characteristic value based on the disaggregation optical data;
>
> S830: determining a first determining threshold range and a second determining threshold range based on the first aggregation characteristic value;
>
> S840: determining that there is a sample abnormality in the blood sample to be tested which leads to an abnormality in the ESR detection result, when the disaggregation characteristic value exceeds the first determining threshold range and the second aggregation characteristic value exceeds the second determining threshold range.

In the embodiment shown in FIG. 8, after the first and second aggregation characteristic values are obtained, it is determined within which theoretical range the disaggregation characteristic value of the blood sample having the first aggregation characteristic value should be (i.e. determining the first determining threshold range based on the first aggregation characteristic value), and it is determined within which theoretical range the second aggregation characteristic value of the blood sample having the first aggregation characteristic value should be (i.e. determining the second determining threshold range based on the first aggregation characteristic value). When the disaggregation characteristic value and the second aggregation characteristic value of the blood sample to be tested exceed the corresponding theoretical range, it is indicated that there is a sample abnormality in the blood sample to be tested that leads to an abnormality in the ESR detection result.

For example, in the embodiment as shown in FIG. 8, the theoretical range (i.e. the first determining threshold range) of the obtained disaggregation characteristic value and the theoretical range (i.e. the second determining threshold range) of the obtained the second aggregation characteristic value may be determined according to the ESR detection result, the corrected ESR detection result, or the AUC of the erythrocyte aggregation curve (i.e. the first aggregation characteristic value) of the blood sample to be tested, and then it may be determined whether the disaggregation characteristic value and the second aggregation characteristic value both exceed the corresponding theoretical range, so as to determine whether there is a sample abnormality in the blood sample to be tested that leads to an abnormality in the ESR detection result. Therefore, whether there is a sample abnormality in the blood sample to be tested that leads to an abnormality in the ESR detection result may be determined more accurately in this way, and the corresponding determination result is also more reliable.

For other specific descriptions of the steps shown in FIG. 8, reference may be made to the description in the related embodiments shown in FIGS. 4 and 7, and details will not be repeated here.

Figure 9:
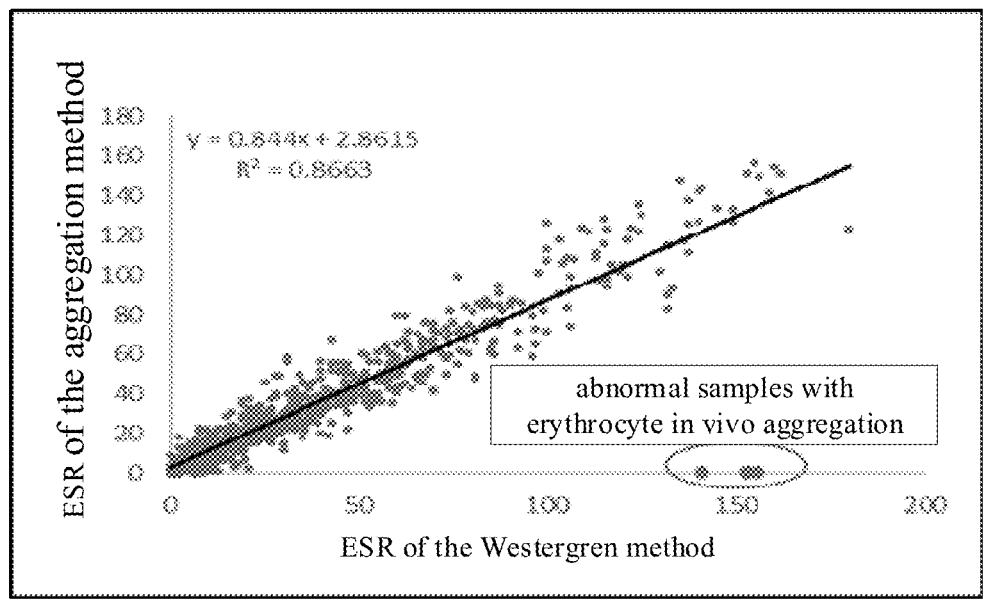
FIG. 9 is a schematic diagram showing the correlation between ESR of the aggregation method obtained by using the erythrocyte aggregation method and ESR of the Westergren method obtained by using the Westergren method.

As shown in FIG. 9, ESR detection was performed respectively on some blood samples using the erythrocyte aggregation method and the Westergren method. The correlation between the ESRs of the aggregation method obtained by the erythrocyte aggregation method and the ESRs of the Westergren method obtained by the Westergren method is greater than 0.9, which shows that the ESRs of the erythrocyte aggregation method and the ESRs of the Westergren method have good consistency. However, in FIG. 9, there are 3 abnormal samples with erythrocyte in vivo aggregation, whose ESRs of the erythrocyte aggregation method are unreliable.

As can be seen from FIG. 9, for abnormal samples in which erythrocyte in vivo aggregation exists before the measurement by the erythrocyte aggregation method, the difference between ESR of the aggregation method and ESR of the Westergren method is large, i.e., ESR of the aggregation method is unreliable. For such samples, there is a higher clinical risk if there is no alarm prompt.

Therefore, the ESR detection device 100 provided by the embodiments of the present disclosure may be used for ESR detection, so as to determine abnormal samples by utilizing the disaggregation optical data and the aggregation optical data during the ESR detection process and output an alarm prompt, thereby reducing clinical risk.

Figure 10:
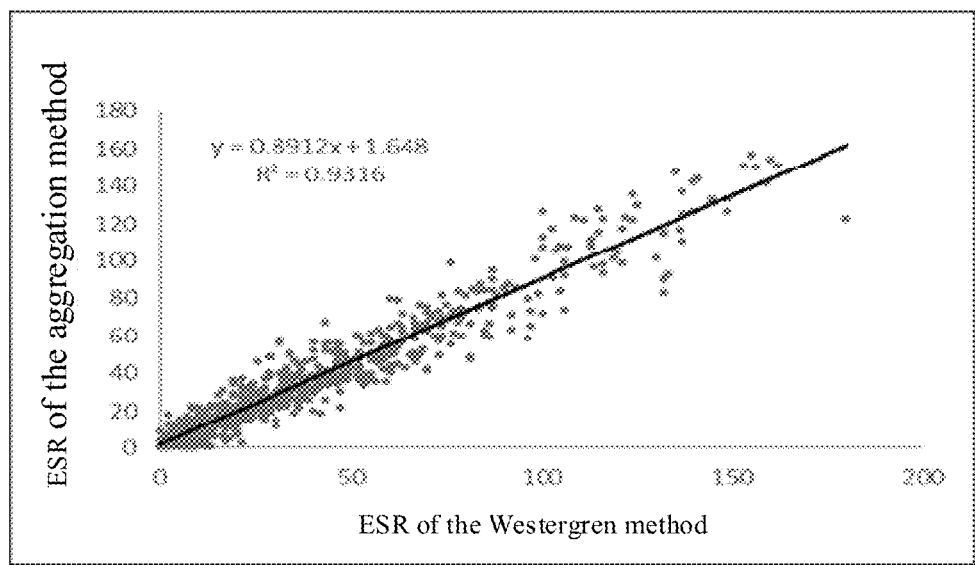
FIG. 10 is a schematic diagram showing the correlation between the aggregation method ESR and the Westergren method ESR after removal of abnormal samples.

FIG. 10 is a schematic view of the correlation between ESR of the erythrocyte aggregation method and ESR of the Westergren method after removing abnormal samples prompted by an alarm. As shown in FIG. 10, after the abnormal samples prompted by an alarm are removed, the correlation between ESR of the erythrocyte aggregation method and ESR of the Westergren method is improved, and the corresponding ESR of the aggregation method is more reliable.

In some embodiments, the data processing module 30 may be further configured for: for the blood sample to be tested, for which an alarm prompt has been outputted, outputting a prompt which suggests the user continuing to test the blood sample to be tested by using the Westergren method.

Figure 11:
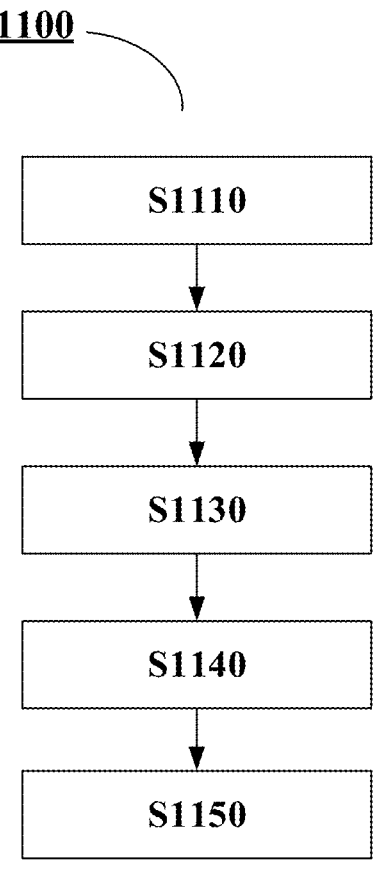
FIG. 11 is a flowchart of one embodiment of the ESR detection method according to the present disclosure.

With reference to FIG. 11, an embodiment of the present disclosure further provides an ESR detection method 1100, said ESR detection method including:

S1110: collecting a blood sample to be tested and transporting at least part of the blood sample to be tested to an ESR detection pipe;

S1120: disaggregating erythrocytes in the at least part of the blood sample by causing the at least part of the blood sample to flow back and forth in the ESR detection pipe, and stopping the disaggregation process such that the erythrocytes in the at least part of the blood sample in the ESR detection pipe are reaggregated, so as to obtain, by means of optical measurement, disaggregation optical data of the at least part of the blood sample during disaggregation of the erythrocytes and/or aggregation optical data of the at least part of the blood sample during reaggregation of the erythrocytes;

S1130: obtaining an ESR detection result of the blood sample to be tested based on the aggregation optical data;

S1140: determining, based on at least one of the disaggregation optical data and the aggregation optical data, whether or not there is a sample abnormality in the blood sample to be tested that leads to an abnormality in the ESR detection result;

S1150: outputting an alarm prompt when it is determined that the sample abnormality is present.

In some preferred embodiments, in step S1140, it may be determined, based on the disaggregation optical data and the aggregation optical data, whether or not there is a sample abnormality in the blood sample to be tested that leads to an abnormality in the ESR detection result.

In some embodiments, step S1140 may include the following steps:

obtaining a first aggregation characteristic value based on the aggregation optical data;

obtaining a disaggregation characteristic value based on the disaggregation optical data, and/or obtaining, based on the aggregation optical data, a second aggregation characteristic value different from the first aggregation characteristic value;

determining a first determining threshold range and/or a second determining threshold range based on the first aggregation characteristic value;

determining that there is a sample abnormality in the blood sample to be tested that leads to an abnormality in the ESR detection result, when the disaggregation characteristic value exceeds the first determining threshold range and/or the second aggregation characteristic value exceeds the second determining threshold range.

Preferably, step S1140 may include the following steps:

obtaining, based on the aggregation optical data, a first aggregation characteristic value and a second aggregation characteristic value different from the first aggregation characteristic value;

obtaining a disaggregation characteristic value based on the disaggregation optical data;

determining a first determining threshold range and a second determining threshold range based on the first aggregation characteristic value;

determining that there is a sample abnormality in the blood sample to be tested that leads to an abnormality in the ESR detection result, when the disaggregation characteristic value exceeds the first determining threshold range and the second aggregation characteristic value exceeds the second determining threshold range.

In some embodiments, the aggregation optical data includes an erythrocyte aggregation curve of light intensity of transmission light transmitted through the at least part of the blood sample or scattered light scattered by the at least part of the blood sample over time during reaggregation of the erythrocytes.

In some embodiments, the first aggregation characteristic value may be the ESR detection result or may be an area enclosed by the erythrocyte aggregation curve and a time axis in a time period from a measurement starting time point to a measurement ending time point.

In some embodiments, the second aggregation characteristic value may be selected from the group consisting of a minimum value of the light intensity of the erythrocyte aggregation curve in the time period from the measurement starting time point to the measurement ending time point, a difference value between the light intensity at the measurement starting time point and the light intensity at the measurement ending time point, and a time point corresponding to ½ of the light intensity at the measurement ending time point.

Preferably, the second aggregation characteristic value is the time point corresponding to ½ of the light intensity at the measurement ending time point. In some embodiments, the disaggregation optical data includes an erythrocyte disaggregation curve of light intensity of transmission light transmitted through the at least part of the blood sample or scattered light scattered by the at least part of the blood sample over time during disaggregation of the erythrocytes.

In some embodiments, the disaggregation characteristic value is a mean value of the light intensity of the erythrocyte disaggregation curve in a time period from a measurement starting time point to a measurement ending time point, or a standard deviation of the light intensity of the erythrocyte disaggregation curve in a time period from a measurement starting time point to a measurement ending time point.

In some embodiments, the ESR detection method 1100 may further include: performing blood routine detection on another part of the blood sample to be tested to obtain blood routine detection data of the blood sample to be tested; and correcting the ESR detection result according to the blood routine detection data to obtain a corrected ESR detection result.

In some embodiments, the first aggregation characteristic value may be the corrected ESR detection result.

For other embodiments and advantages of the ESR detection method 1100 provided according to the present disclosure, reference may be made to the description of the ESR detection device 100 provided according to the present disclosure, which is not repeated herein.

It should be noted that, the involved term "first/second/ third" in the embodiments of the present disclosure is merely intended to distinguish similar objects but does not necessarily indicate a specific order of an object. It may be understood that "first/second/third" is interchangeable in terms of a specific order or sequence if permitted.

The features or feature combinations mentioned above in the description, in the drawings and in the claims may be used in any combination with one another or alone as long as they have meanings within the scope of the present disclosure and do not contradict each other. The advantages and features described for the ESR detection device provided by the present disclosure is applicable in a corresponding manner to the ESR detection method provided by the present disclosure and vice versa.

The foregoing description merely relates to the preferred embodiments of the present disclosure, and it is not intended to limit the scope of patent of the present disclosure. All equivalent variations made according to the content in the description and the accompanying drawings of the present disclosure from the concept of the present disclosure, or the direct/indirect applications of the contents in other related technical fields shall all fall within the scope of patent protection of the present disclosure.

What is claimed is:

1. An erythrocyte sedimentation rate (ESR) detection device, comprising a sample collecting and dispensing module, an ESR detection module and a data processing module; wherein the sample collecting and dispensing module is configured for collecting a blood sample to be tested and dispensing at least part of the blood sample to be tested to the ESR detection module;

the ESR detection module is configured for disaggregating erythrocytes in the at least part of the blood sample by causing the dispensed at least part of the blood sample to flow back and forth in a detection zone of the ESR detection module, and stopping the disaggregation process to stop a flow of the at least part of the blood sample in the detection zone and then keep the at least part of the blood sample in the detection zone still, so as to obtain disaggregation optical data of the at least part of the blood sample during disaggregation of the erythrocytes or aggregation optical data of the at least part of the blood sample during a still phase after the flow of the at least part of the blood sample is stopped;

the data processing module is configured for:

obtaining an ESR detection result of the blood sample to be tested based on the aggregation optical data;

determining, based on at least one of the disaggregation optical data and the aggregation optical data, whether a sample abnormality is in the blood sample to be tested that leads to an abnormality in the ESR detection result; and outputting an alarm prompt when it is determined that the sample abnormality is present.

2. The ESR detection device according to claim 1, wherein, when determining, based on at least one of the disaggregation optical data and the aggregation optical data, whether the sample abnormality is in the blood sample to be tested that leads to the abnormality in the ESR detection result, the data processing module is further configured for determining, based on the disaggregation optical data and the aggregation optical data, whether the sample abnormality is in the blood sample to be tested that leads to the abnormality in the ESR detection result.

3. The ESR detection device according to claim 1, wherein, when determining, based on at least one of the disaggregation optical data and the aggregation optical data, whether the sample abnormality is in the blood sample to be tested that leads to the abnormality in the ESR detection result, the data processing module is further configured for:

obtaining a first aggregation characteristic value based on the aggregation optical data;

obtaining a disaggregation characteristic value based on the disaggregation optical data, or obtaining, based on the aggregation optical data, a second aggregation characteristic value different from the first aggregation characteristic value;

determining a first determining threshold range or a second determining threshold range based on the first aggregation characteristic value; and determining the sample abnormality is in the blood sample to be tested that leads to the abnormality in the ESR detection result, when the disaggregation characteristic value exceeds the first determining threshold range or the second aggregation characteristic value exceeds the second determining threshold range.

4. The ESR detection device according to claim 3, wherein, when determining, based on at least one of the disaggregation optical data and the aggregation optical data, whether the sample abnormality that leads to the abnormality is in the ESR detection result, the data processing module is further configured for:

obtaining, based on the aggregation optical data, a first aggregation characteristic value and a second aggregation characteristic value different from the first aggregation characteristic value;

obtaining a disaggregation characteristic value based on the disaggregation optical data;

determining a first determining threshold range and a second determining threshold range based on the first aggregation characteristic value; and determining the sample abnormality is in the blood sample to be tested that leads to the abnormality in the ESR detection result, when the disaggregation characteristic value exceeds the first determining threshold range and the second aggregation characteristic value exceeds the second determining threshold range.

5. The ESR detection device according to claim 3, wherein the aggregation optical data comprises an erythrocyte aggregation curve of light intensity of transmission light transmitted through the at least part of the blood sample or scattered light scattered by the at least part of the blood sample over time during the still phase after the flow of the at least part of the blood sample is stopped; and the first aggregation characteristic value is the ESR detection result or is an area enclosed by the erythrocyte aggregation curve and a time axis in a time period from a measurement starting time point to a measurement ending time point; or, the second aggregation characteristic value is selected from the group consisting of a minimum value of the light intensity of the erythrocyte aggregation curve in the time period from the measurement starting time point to the measurement ending time point, a difference value between the light intensity at the measurement starting time point and the light intensity at the measurement ending time point, and a time point corresponding to ½ of the light intensity at the measurement ending time point.

6. The ESR detection device according to claim 5, wherein the second aggregation characteristic value is the time point corresponding to ½ of the light intensity at the measurement ending time point.

7. The ESR detection device according to claim 3, wherein the disaggregation optical data comprises an erythrocyte disaggregation curve of light intensity of transmission light transmitted through the at least part of the blood sample or scattered light scattered by the at least part of the blood sample over time during disaggregation of the erythrocytes; and the disaggregation characteristic value is a mean value of the light intensity of the erythrocyte disaggregation curve in a time period from a measurement starting time point to a measurement ending time point, or a standard deviation of the light intensity of the erythrocyte disaggregation curve in a time period from a measurement starting time point to a measurement ending time point.

8. The ESR detection device according to claim 3, wherein the ESR detection device further comprises a blood routine detection module;

the sample collecting and dispensing module is further configured for dispensing another part of the blood sample to be tested to the blood routine detection module;

the blood routine detection module is configured for performing blood routine detection on the another part of the blood sample to obtain blood routine detection data of the blood sample to be tested; and the data processing module is further configured for correcting the ESR detection result according to the blood routine detection data to obtain a corrected ESR detection result.

9. The ESR detection device according to claim 8, wherein the first aggregation characteristic value is the corrected ESR detection result.

10. An ESR detection method, comprising:

collecting a blood sample to be tested and transporting at least part of the blood sample to be tested to an ESR detection pipe;

disaggregating erythrocytes in the at least part of the blood sample by causing the at least part of the blood sample to flow back and forth in the ESR detection pipe, and stopping the disaggregation process to stop a flow of in the at least part of the blood sample in the ESR detection pipe and then keep the at least part of the blood sample in the detection zone still, so as to obtain, by means of optical measurement, disaggregation optical data of the at least part of the blood sample during disaggregation of the erythrocytes or aggregation optical data of the at least part of the blood sample during a still phase after the flow of the at least part of the blood sample is stopped;

obtaining an ESR detection result of the blood sample to be tested based on the aggregation optical data;

determining, based on at least one of the disaggregation optical data and the aggregation optical data, whether a sample abnormality is in the blood sample to be tested that leads to an abnormality in the ESR detection result; and outputting an alarm prompt when it is determined that the sample abnormality is present.

11. The method according to claim 10, wherein determining, based on at least one of the disaggregation optical data and the aggregation optical data, whether the sample abnormality is in the blood sample to be tested that leads to the abnormality in the ESR detection result comprises:

determining, based on the disaggregation optical data and the aggregation optical data, whether the sample abnormality is in the blood sample to be tested which leads to the abnormality in the ESR detection result.

12. The method according to claim 10, wherein determining, based on at least one of the disaggregation optical data and the aggregation optical data, whether the sample abnormality is in the blood sample to be tested that leads to the abnormality in the ESR detection result comprises:

obtaining a first aggregation characteristic value based on the aggregation optical data;

obtaining a disaggregation characteristic value based on the disaggregation optical data, or obtaining, based on the aggregation optical data, a second aggregation characteristic value different from the first aggregation characteristic value;

determining a first determining threshold range or a second determining threshold range based on the first aggregation characteristic value; and determining the sample abnormality is in the blood sample to be tested that leads to the abnormality in the ESR detection result, when the disaggregation characteristic value exceeds the first determining threshold range or the second aggregation characteristic value exceeds the second determining threshold range.

13. The method according to claim 12, wherein determining, based on at least one of the disaggregation optical data and the aggregation optical data, whether the sample abnormality is in the blood sample to be tested that leads to the abnormality in the ESR detection result comprises:

obtaining, based on the aggregation optical data, a first aggregation characteristic value and a second aggregation characteristic value different from the first aggregation characteristic value;

obtaining a disaggregation characteristic value based on the disaggregation optical data;

determining a first determining threshold range and a second determining threshold range based on the first aggregation characteristic value; and determining the sample abnormality is in the blood sample to be tested that leads to the abnormality in the ESR detection result, when the disaggregation characteristic value exceeds the first determining threshold range and the second aggregation characteristic value exceeds the second determining threshold range.

14. The method according to claim 12, wherein the aggregation optical data comprises an erythrocyte aggregation curve of light intensity of transmission light transmitted through the at least part of the blood sample or scattered light scattered by the at least part of the blood sample over time during the still phase after the flow of the at least part of the blood sample is stopped; and the first aggregation characteristic value is the ESR detection result or is an area enclosed by the erythrocyte aggregation curve and a time axis in a time period from a measurement starting time point to a measurement ending time point; or the second aggregation characteristic value is selected from the group consisting of a minimum value of the light intensity of the erythrocyte aggregation curve in the time period from the measurement starting time point to the measurement ending time point, a difference value between the light intensity at the measurement starting time point and the light intensity at the measurement ending time point, and a time point corresponding to ½ of the light intensity at the measurement ending time point.

15. The method according to claim 14, wherein the second aggregation characteristic value is the time point corresponding to ½ of the light intensity at the measurement ending time point.

16. The method according to claim 12, wherein the disaggregation optical data comprises an erythrocyte disaggregation curve of light intensity of transmission light transmitted through the at least part of the blood sample or scattered light scattered by the at least part of the blood sample over time during disaggregation of the erythrocytes; and the disaggregation characteristic value is a mean value of the light intensity of the erythrocyte disaggregation curve in a time period from a measurement starting time point to a measurement ending time point, or a standard deviation of the light intensity of the erythrocyte disaggregation curve in a time period from a measurement starting time point to a measurement ending time point.

17. The method according to claim 12, further comprising:

performing blood routine detection on another part of the blood sample to be tested to obtain blood routine detection data of the blood sample to be tested; and correcting the ESR detection result according to the blood routine detection data to obtain a corrected ESR detection result.

18. The method according to claim 17, wherein the first aggregation characteristic value is the corrected ESR detection result.

*    *    *    *    *